INVENTOR,
Donald E. Warden
BY: Harry M. Saragovitz,
Edward J. Kelly & Herbert Berl
ATTORNEYS.

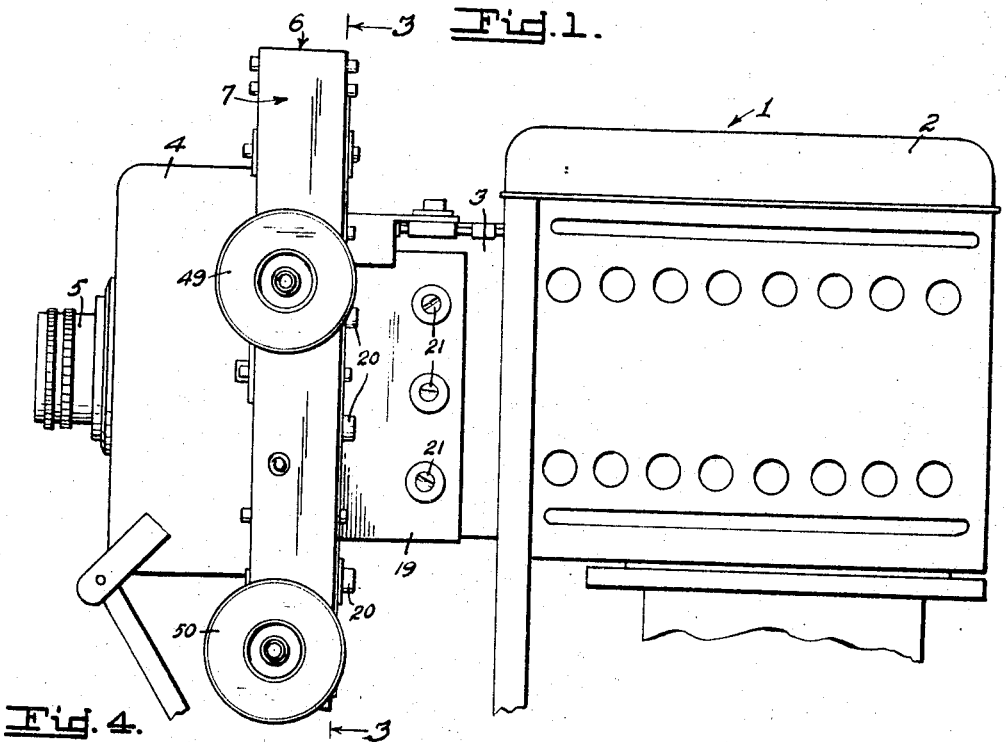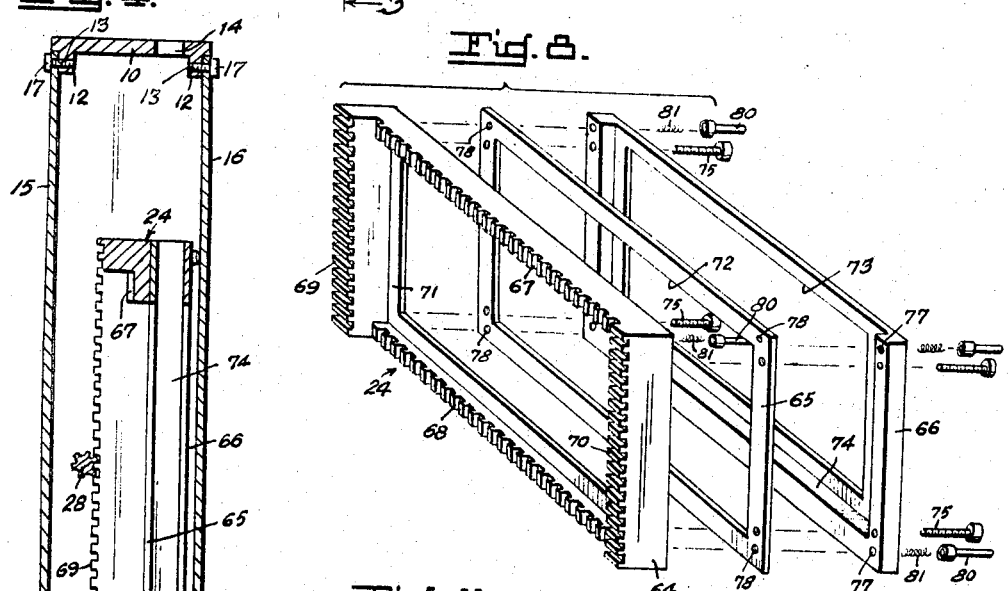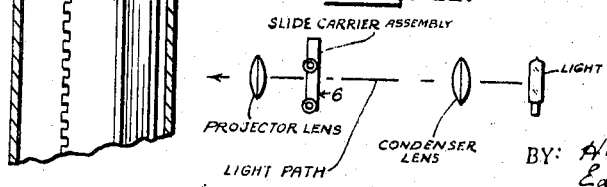

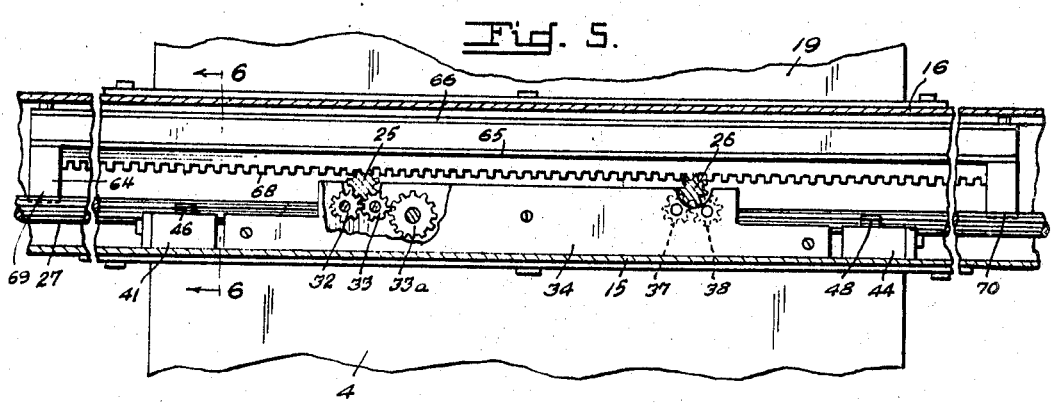
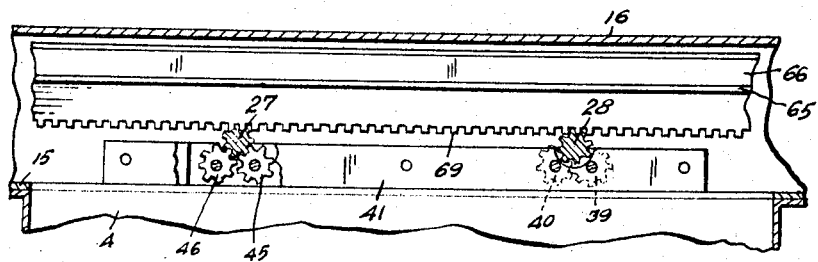
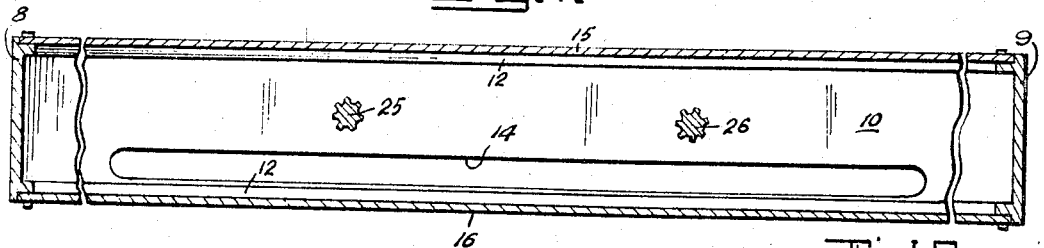
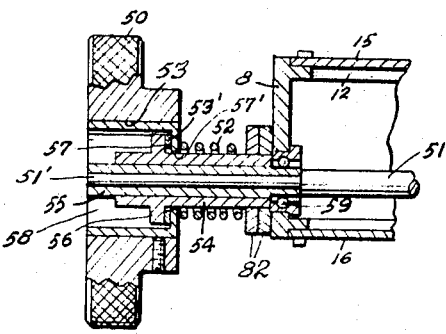
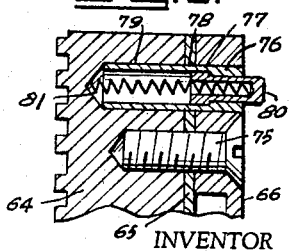

United States Patent Office 3,450,472
Patented June 17, 1969

3,450,472
CONTROLLED AREA PROJECTOR
Donald E. Warden, Hampton, Va., assignor to the United States of America as represented by the Secretary of the Army
Filed Aug. 11, 1966, Ser. No. 572,172
Int. Cl. G03b 21/00, 23/10
U.S. Cl. 353—11                                6 Claims

ABSTRACT OF THE DISCLOSURE

A slide holder for use with a controlled area projector. The slide holder is movable in horizontal, vertical and diagonal directions to enable the projector to project a map slide in properly oriented position on symbology which has been projected on the screen by the projector. The slide holder is mounted in a box and has horizontal and vertical gear mechanisms for moving the slide holder. The horizontal gear mechanism has two horizontal pinion wires journaled in the sides of the box. The vertical gear mechanism has two vertical pinion wires journaled in the top and bottom of the box. Two vertically positioned gear boxes, each having a pair of idler spur gears, are provided to mesh with the two horizontal pinion wires. Two horizontally positioned gear boxes, each having a pair of idler spur gears, are provided to mesh with the two vertical pinion wires. A driving mechanism having two bevel gears, a shaft and a knob is provided to drive the vertical pinion wires. A knob mounted on the outer end of a horizontal pinion wire, is provided to drive the horizontal pinion wires.

---

The invention described herein may be manufactured and used by or for the Government, for governmental purposes, without the payment to me of any royalty thereon.

This invention relates to a controlled area projector and more particularly to a means to enable a film projector to control the area of a large transparency that is to be projected on a screen and consists, briefly, of a film carrier assembly disposed between the condenser lens and the projector lens and which is movable in x-y axis whereby transparencies of standard military maps or other data may be projected on a screen in connection with military or other symbology, also projected thereon by a separate projection system.

The present system uses transparencies of standard military maps placed in a projector and projected onto a screen. Military symbology, which is under digital computor control, and in a separate projection system is projected onto the same screen. Together the two images portraying positions of troops, equipment, installation, fortifications, etc.

The symbology is under digital computer control.

Such display required the use of a separate map transparency for each projection. This required that each spot of the map to be projected be contained in 100 separate frames to meet the military requirements to advance in any direction in increments of 10%.

The map transparency previously in use (similar to a 35 mm. slide) is replaced by a large map transparency (for example, 9″ x 9″), herein called a film and a selected (or controlled) area (equal to the same area projected in the original system) can now be projected.

The film carrier can be advanced in any direction and permits the projected area to be selected from any sequence of the large transparent film.

It is a primary objective of this invention to provide a controlled film carrier for projecting a map image on to a screen, together with symbology, which is under computer control in a separate projection system.

Another object is to provide a film carrier having a larger transparent area than that to be projected onto a screen.

A further object is to provide a film carrier for a projector which is movable in all directions.

A final object is to reduce the number of film frames to be used in projecting symbology in a projector.

These and other objects and advantages of the present invention will be fully apparent from the following description when taken in connection with the annexed drawings, in which:

FIG. 1 is a side elevation of the upper portion of a film projector with the film carrier of this invention mounted therein;

FIG. 1 is a front view of the film projector with parts broken away to expose operating parts;

FIG. 4 is a sectional detail view taken along line 4—4 of FIG. 2;

FIG. 5 is a sectional detail view taken along line 5—5 of FIG. 3;

FIG. 6 is a sectional detail view taken along line 6—6 of FIG. 5;

FIG. 7 is a sectional detail view taken along line 7—7 of FIG. 3;

FIG. 8 is an exploded perspective view of the slide carrier;

FIG. 9 is a sectional detail view of the plunger mechanism taken along line 9—9 of FIG. 3;

FIG. 10 is a sectional detail view of one of the knobs and taken along line 10—10 of FIG. 3; and, FIG. 11 is a diagram illustrating the relative positions of the projector elements.

Figure 2:
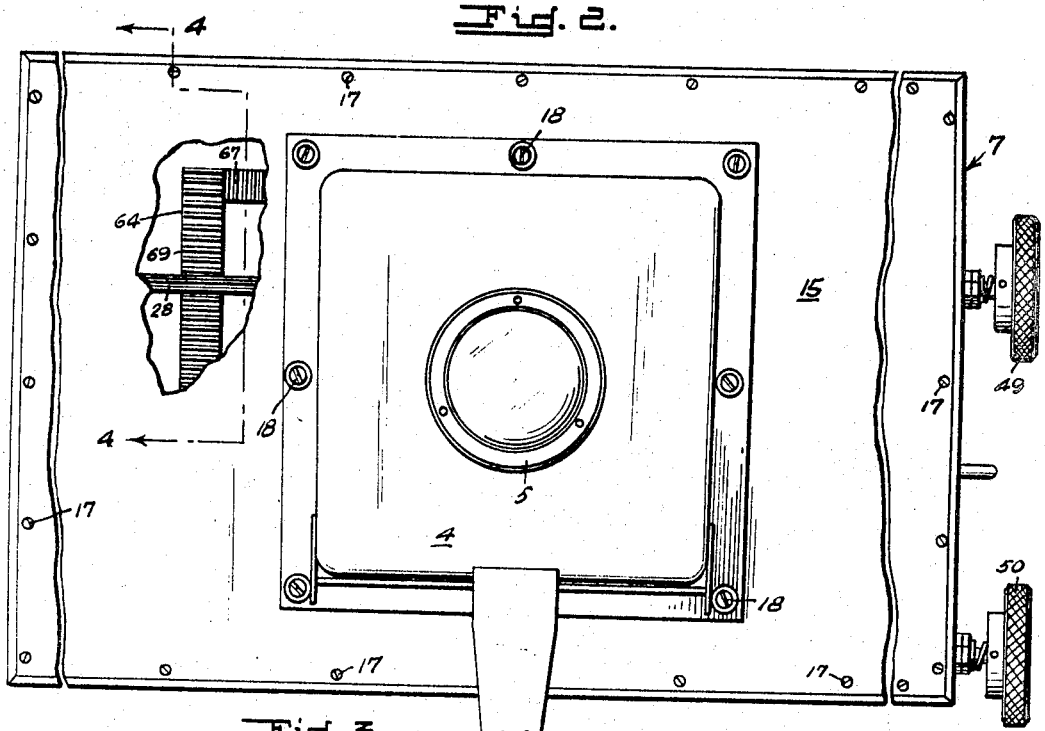

Referring in detail to the drawings, reference character 1 designates generally a film projector.

Film projector

Film projector 1 includes a light housing 2, a condenser lens housing 3 contains, a bellows 4 and a projector lens housing 5. The light housing 2 contains the usual means for illumination, condenser housing 3 the condenser lens bellows 4 the focusing means for the projector, and projector lens housing 5 the projecting, or collimating lens assembly, all not shown in detail, since they are standard items and form no part of this invention.

Slide carrier assembly

The slide carrier assembly of the invention is indicated generally by 6 and includes a housing, and a rack and pinion assembly, indicated generally by 7, shown mounted between the condenser housing 3 and the bellows 4 (FIG. 1).

Figure 3:
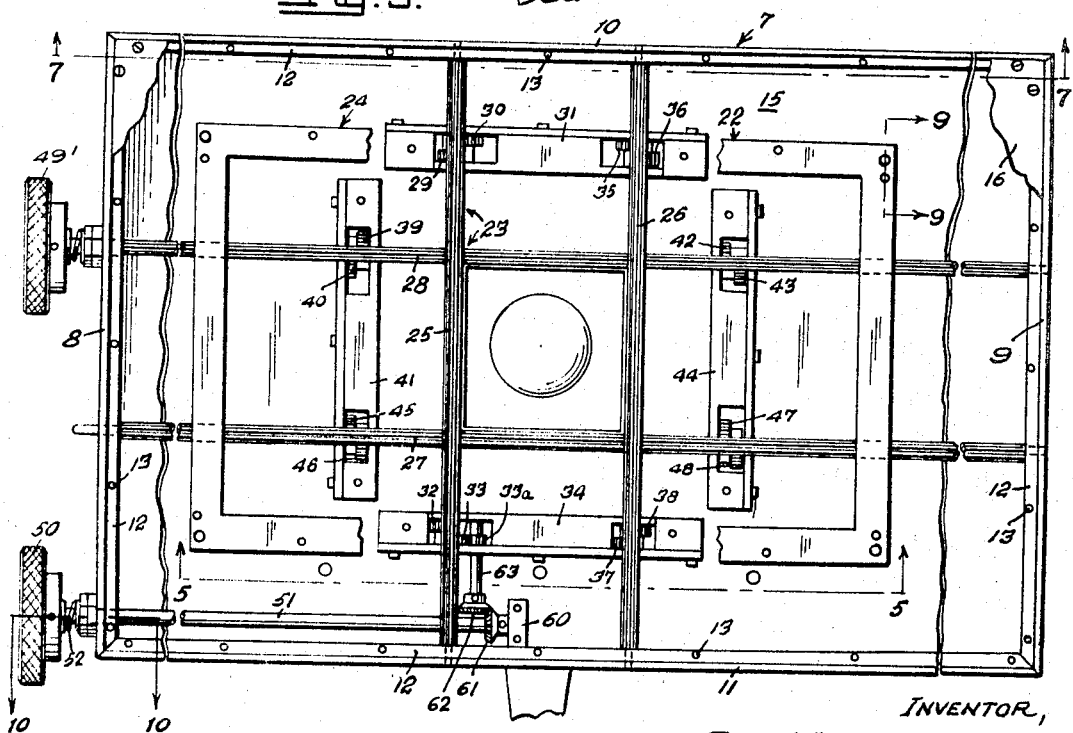
FIG. 3 is a view taken along 3—3 of FIG. 1 and looking in the direction of the arrows, the rear plate of the film carrier housing being broken away.

Housing 7 comprises a rectangular shaped box having sides of similar cross sectional design and comprises end sides 8 and 9, a top side 10 and a bottom side 11, as best seen in FIG. 3.

Each side is provided with integral, set-in runners 12 which are provided with spaced, threaded holes 13.

Top side 10 is provided with a slot 14 as best seen in FIG. 7 for a purpose to be obvious later.

A front plate 15 and a rear plate 16 complete the box assembly. Front plate 15 is bolted to runners 12 by bolts 17 in threaded holes 13 in one set of runners and the rear plate similarly bolted to the other set of runners 12.

Bellows housing 4 is bolted to the front plate 15 by bolts 18.

An adapter 19 bolted to the rear plate 16 by bolts 20 provides means for bolting housing 6 to condenser housing 3 by bolts 21.

The rack and pinion assembly is indicated generally by 22 and is seen in its entirety in FIG. 3 and is shown lookng in a forward direction, the rear plate 16 being broken away. The rack and pinion assembly includes a driving mechanism, indicated generally by 23 and a slide holder indicated generally by 24.

*Drive mechanism*

The driving mechanism is mounted in housing 7 and consists of a driven pinion wire 25 and an idler pinion wire 26. Both pinion wires 25 and 26 are journaled in vertical spaced relation in top side 10 and bottom side 11.

A second pair of pinion wires 27 and 28 are journaled horizontally in end sides 8 and 9, pinion wire 28 being a driven pinion wire and pinion wire 27 being an idler pinion wire.

Pinion wire 25 meshes with idler spur gears 29 and 30 in a horizontally disposed gear box 31 and with idler spur gears 32 and 33 journaled in a horizontally disposed gear box 34. Both gear boxes 31 and 34 are spaced apart and are mounted on the front plate 15.

Pinion wire 26 meshes with idler gears 35 and 36 journaled in gear box 31 and with idler spur gears 37 and 38 journaled in gear box 34.

Pinion wire 28 meshes with idler spur gears 39 and 40 journaled in a vertically disposed gear box 41 and with idler spur gears 42 and 43 journaled in a vertically disposed gear box 44.

Pinion wire 27 meshes with idler spur gears 45 and 46 journaled in gear box 41 and with idler spur gears 47 and 48 journaled in gear box 44. Gear boxes 41 and 44 are also mounted on front wall 15 in spaced relation.

Pinion wires 27 and 28 and the spacing of both sets forms a square somewhat larger than a central opening 49 in front plate 15. This spacing is permitted by the spacing of the spur gears in their respective gear boxes.

Gear boxes 31 and 34 will be of greater height than gear boxes 41 and 44 to accommodate the offset position of the pinion wire pairs as best seen in FIGS. 3 and 5.

Pinion wires 25 and 28 may be driven by small electric motors (not shown) which may be controlled by switches, etc., or through a digital or analog converter. However manual operating means are shown in the drawings as one means of operating the pinion wires and consists of knobs 49' and 50.

Both knobs 49' and 50 are identical in construction and knob 50 will be herein described only since knob 49' drives pinion wire 28 directly and knob 50 is indirectly connected to drive pinion wire 25, and this drive is best seen in FIGS. 3 and 10.

A rod 51 is driven by knob 50 and is journaled in end side 8 by bearings 59 and a block 60 secured to front plate 15, one end of rod 51 extending beyond end side 8 as shown.

Knob 50 is centrally bored as at 53 and a cup shaped member 58 is frictionally fitted therein.

Rod 51 is provided with a reduced end 51' and a sleeve 55 is fitted thereon as shown.

A coupling 54 having an annular flange 56 is fitted over sleeve 55 and sleeve 55 and coupling 54 rotate together with reduced end 51' of rod 51.

The inner wall 57 of cup shaped member 58 is centrally bored as at 57' so that knob 50 and cup shaped member 58 are slidable thereon.

An annular clutch liner 53' is fixed on the inner face of annular flange 56.

A coil spring 52 encircling coupler 54 biases against the outer face of wall 57 of cup shaped member 58 and spacers 82 encircling coupler 54 so that the inner face of wall 57 is normally in contact with clutch liner 53'.

The end of rod 51 extending into end side 8 and journaled in block 60 carries a beveled gear 61 which meshes with a beveled gear 62 carried by one end of a shaft 63. Spur gear 33a is carried by the other end of shaft 63 and is in mesh with spur gear 33. Shaft 63 is journaled in gear box 34 as shown.

Pinion wire 28 may be immobilized at will by pushing in knob 50 to disengage cup shaped member 58 with clutch liner 53'. Likewise pinion wire 28 which may be immobilized by pushing in knob 49'.

*Rack and slide holder assembly*

The rack and slide holder assembly is best seen in FIG. 8 and consists of a rack 64, frame 65 and slide holder 66, all of which are rectangular in shape and of equal outside dimensions.

Rack 64 is provided with horizontal toothed upper and lower horizontal toothed sides 67 and 68 respectively, and toothed ends 69 and 70 on their forward faces. Teeth 67 and 68 are set in from teeth 69 and 70 as shown. A frame portion 71 is provided at its rearward end as shown.

Frame 65 comprises a planar sided, rectangular member having a rectangular opening 72 of the same size as the inner perimeter of frame portion 71 of rack 64.

Slide holder 66 defines a rectangular member having an opening 73 equal to opening 72 of frame 65 and is further provided with a U-shaped channel 74 as shown.

The assembly of the rack and holder is best seen in FIG. 9, which assembly is identical at all four corners of the device.

As illustrated, all three members are secured together by screws 75.

A plunger assembly is also shown in FIG. 9 and consists of a sleeve 76 which is nested in bores 77, 78 and 79 in holder 66, frame 65 and rack 44 respectively. A Teflon plunger 80 is slidable in sleeve 76 and is biased outwardly by a spring 81 as shown.

When the rack and slide holder is properly assembled in the slide carrier 6, toothed sides 67 and 68 will mesh with pinion wires 25 and 26 while toothed ends 69 and 70 will mesh with pinion wires 27 and 28.

The rack and slide holder assembly will be, of course, properly squared with respect to the opening 49 in front plate 15, so that an indicia on a slide carried thereby will be properly placed on the symbology projected on a a screen, not shown.

Plungers 80 (four in number, one at each corner of the rack and slide holder assembly) bias against the rear plate 16 and hold the rack 64 in mesh with the pinion wires.

*Operation*

As seen in FIG. 11, the basic elements of the projector are shown in their relative positions.

A transparent map slide, not shown, or other data, is passed through slot 14 in the top of housing 7 and into the U-shaped channel 74 in slide holder 66 whereupon the image of the map will also be projected onto the screen, whereupon the symbology is also projected, by a separate projection system.

By proper manipulation of knobs 49' and 50, the map image may be located specifically at the intended location of the symbology on the projection.

The slide holder may be moved horizontally, vertically and diagonally as needed by the knobs, or by electric motors actuated by a digital to analog converter if desired.

Means for removing a slide from the slide holder may be provided, if desired, and may consist of tabs (not shown) projecting through slot 14.

It is apparent that the rack and slide holder can be of larger area than a map to be projected because it can be moved into position at will, since there is considerable latitude for movement within the slide carrier housing.

The slide carrier assembly can be built to accommodate any size transparencies and can accommodate a transparency of any size smaller than the maximum.

As illustrated, the slide carrier is mounted in a vertical plane for straight on projection, but it could be mounted on a horizontal plane and projected by the use of folded optic with little conversion of the projector to be used.

While the device of the invention is particularly useful in military applications, it can be used in any application requiring a display of an image greater than that which can be projected at one time where any point of the image may be required to be the center point of the projected area.

While only a preferred form of the invention is shown and described, other forms of the invention are contemplated and numerous changes and modifications may be made therein without departing from the spirit of the invention as set forth in the appended claims.

What is claimed is:

1. In combination with a projection system under computer control for projecting symbology on a screen, a controlled area projector including a light source housing, a condenser lens housing, a bellows housing, a projecting lens housing, a slide carrier assembly for use in projecting a map image mounted in said projector between said condenser lens housing and said projecting lens housing, a rectangular box secured in vertical arrangement between said condenser lens housing and said projecting lens housing, a slide holder mounted in said box, and horizontally and vertically disposed gear mechanisms mounted in said box for moving said slide holder in horizontal, vertical and diagonal directions therein whereby a transparent map slide when in said slide holder may be projected by said projector in properly oriented position on said symbology; said horizontally disposed gear mechanism comprising first and second horizontally extending, vertically spaced, pinion wires journaled in the end sides of said box, said first pinion wire extending beyond one of the box sides, first and second vertically disposed, horizontally spaced gear boxes mounted on the inner face of the forward side of said box, a first pair of idler spur gears journaled in each gear box and being in mesh with said first pinion wire, a second pair of idler spur gears journaled in each said gear box and in mesh with said second pinion wire and a driving means connected with the extending end of said first pinion wire.

2. A slide carrier assembly as set forth in claim 1 wherein said rectangular box comprises top, bottom and end slides, a rear plate secured to said condenser housing and a front plate secured to said bellows housing, there being runners integral with the inner sides of said top, bottom and end sides for connection with said rear and front plates and an elongated slot in the top side of said box.

3. A slide carrier assembly as set forth in claim 1 wherein said vertically disposed gear mechanism comprises a first and second vertically disposed, horizontally spaced, pinion wires journaled in the top and bottom sides of said box, first and second vertically spaced, gear boxes mounted on the inner face of the forward side of said box, an idler spur gear and a driven spur gear journaled in said first gear box and being in mesh with said first pinion wire, a pair of idler spur gears journaled in said first gear box in mesh with said second pinion wire, a first and a second pair of idler gears journaled in said second gear box in mesh with said first and second pinion wires respectively and means for driving said driven spur gear mounted in said box.

4. A mechanism as set forth in claim 3 wherein said means for driving said driven spur gear comprises a horizontally disposed shaft journaled in one side of said box and a block secured to the floor thereof, a first beveled gear fixed to the inner end of said shaft and adjacent said block, a vertically disposed axle journaled in said first gear box, its upper end being fixed to said driven spur gear therein, a second beveled gear carried by the lower end of said axle and meshing with said first beveled gear, a knob slidably mounted on the outer end of said shaft and spring loaded clutch means housed in said knob whereby said knob may be pushed out of engagement with said shaft.

5. A slide carrier assembly as set forth in claim 1 wherein said slide holder consists of a composite, rectangular frame including rack, frame and slide holder members, said rack member comprising upper and lower horizontal toothed racks and vertical end toothed racks, said horizontal racks being inset from said end racks, said horizontal and end racks being adapted to mesh with said horizontal and vertical gear mechanisms respectively, said frame comprising a planar sided rectangular frame and said slide holder comprising a rectangular frame having a U-shaped channel and spring loaded means housed in each of the four corners of said composite rectangular frame adapted to bear against the inner side of the rearward side of said box whereby said rack will be held in mesh with said horizontal and vertical gear mechanisms.

6. A slide carrier as set forth in claim 5 wherein said means housed in said composite rectangular frame comprises a spring loaded Teflon plunger normally biased in a rearward direction.

References Cited

UNITED STATES PATENTS

| 2,260,551 | 10/1941 | Boni et al. |
| 2,534,561 | 12/1950 | Silver. |
| 3,122,075 | 2/1964 | Klyce et al. |
| 3,238,841 | 3/1966 | Bjelland et al. |

FOREIGN PATENTS

| 1,231,770 | 4/1960 | France. |
| 747,790 | 10/1944 | Germany. |

MORTON ANSHER, *Primary Examiner.*

ROBERT P. GREINER, *Assistant Examiner.*

U.S. Cl. X.R.

353—108